US011157551B2

United States Patent
Yu et al.

(10) Patent No.: US 11,157,551 B2
(45) Date of Patent: Oct. 26, 2021

(54) METHOD AND DEVICE FOR IMAGE LOADING

(71) Applicant: NetEase (Hangzhou) Network Co., Ltd., Hangzhou (CN)

(72) Inventors: Guo Yu, Hangzhou (CN); Yu Wu, Hangzhou (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 738 days.

(21) Appl. No.: 15/495,999

(22) Filed: Apr. 25, 2017

(65) Prior Publication Data

US 2017/0329803 A1 Nov. 16, 2017

(30) Foreign Application Priority Data

May 10, 2016 (CN) .......................... 201610307346.5

(51) Int. Cl.
*G06F 16/00* (2019.01)
*G06F 16/583* (2019.01)
*G06F 16/51* (2019.01)
*G06T 1/00* (2006.01)

(52) U.S. Cl.
CPC .......... *G06F 16/5838* (2019.01); *G06F 16/51* (2019.01); *G06F 16/5854* (2019.01); *G06T 1/0007* (2013.01)

(58) Field of Classification Search
CPC .. G06F 16/51; G06F 16/5838; G06F 16/5854; G06T 1/0007
See application file for complete search history.

(56) References Cited

U.S. PATENT DOCUMENTS

| | | | |
|---|---|---|---|
| 7,944,453 B1 | 5/2011 | Newhall, Jr. | |
| 2014/0187314 A1* | 7/2014 | Perry | A63F 13/10 |
| | | | 463/29 |
| 2015/0262421 A1* | 9/2015 | Bell | G06T 17/20 |
| | | | 345/423 |
| 2017/0123982 A1* | 5/2017 | Haven | G06F 16/51 |

FOREIGN PATENT DOCUMENTS

| | | |
|---|---|---|
| CN | 1669069 A | 9/2005 |
| CN | 101344961 A | 1/2009 |
| CN | 102799456 A | 11/2012 |
| CN | 103035024 A | 4/2013 |
| CN | 104463944 A | 3/2015 |

* cited by examiner

*Primary Examiner* — Dinku W Gebresenbet
(74) *Attorney, Agent, or Firm* — Quinghong Xu (57) ABSTRACT

The present invention relates to computer technology. In particular, the present invention relates to a method of loading an image and the device thereof. The present invention first loads a thumbnail of the image, and then loads a full version of the image optionally. The present invention does not need to divide the image into multiple scenes, and is also different from other reloading method. Therefore, the method can improve the fluency of a game without interfering other programs, and overcome prior arts' drawbacks, such as limited application, low accuracy of loading and interference of other resources.

9 Claims, 6 Drawing Sheets

METHOD AND DEVICE FOR IMAGE LOADING

CROSS REFERENCE TO RELATED APPLICATIONS

This application claims priority to Chinese Patent Application No. 201610307346.5, filed on May 10, 2016, the entire contents of which are incorporated herein by reference.

TECHNICAL FIELD

The present invention relates to computer technology. In particular, the present invention relates to a method of loading an image and the device thereof.

BACKGROUND ART

This section aims at providing background art and context description for embodiments of the present invention. Descriptions here are not recognized to be prior art only because they are included in this section.

With the development of Internet and the spread of the mobile terminals, it becomes more and more popular to play games on a mobile terminal. Nowadays, games have become an essential entertainment part of life. Domestically, according to incomplete statistics, amateur players and professional players make up 70 percent of the total population. Further study shows that this ratio will have a growing trend over the next few decades.

To make full use of the hardware computing power of a current terminal graphics card, resources such as images need to be stored in the video memory during the game running, which occupies a large amount of video memory. When video memory is used up, the operating system and API (Application Programming Interface) will automatically move some images from a video memory to a memory so as to increase the remaining storage of the video memory. However, this will decrease the running speed of the game, and images will occupy memory resources otherwise allocated to program processes, and thus slow down these program processes because of their insufficient memory resources.

To solve the problems above, there conventionally comes two methods.

First, it divides a scenario into several small scenes and controls the total number of images in each scene.

Second, when failing to load more images due to the lack of video memory, it deletes images kept in the video memory which has not been used for a predetermined period and loads desired new images into the video memory.

SUMMARY OF THE INVENTION

However, the first method has limited applications in games, especially for players equipped with diverse and elaborate scenes. The second method cannot accurately identify the images to be loaded, and if wrong images were loaded, it will affect the loading of other resources.

As a result, there needs an advanced method and device of loading images, which can be widely used in games to improve the accuracy of image loading without sacrificing the loading of other resources.

In the first aspect of the embodiment, there provides a method to load images which includes: loading a thumbnail of each image of a plurality of images; calculating a weight of each image of the plurality of images; ranking said plurality of images on the basis of their respective weights; selecting N images out of said plurality of images by choosing N consecutive images having maximum weights from said plurality of ranked images; loading said N images' full version, wherein the total size of said N images' full version is less than or equal to a first threshold.

In an embodiment, according to the first aspect, wherein the thumbnail is generated by following steps: obtaining a series of MIP maps for respective one of said plurality of images; finding a MIP map of the lowest resolution from said series of MIP maps; generating a thumbnail for said respective image on the basis of the MIP map of the lowest resolution.

In some embodiments, according to the first aspect, the size of a thumbnail is 0.5%-2% of the size of its full version.

In some embodiments, according to the first aspect, calculating each image's weight includes: deciding at least one model associated with said image; calculating the weight of said image based on an attribute parameter of said at least one model and/or a category to which the image belongs.

In some embodiments, according to the first aspect, wherein the step of calculating the weight of said image based on the attribute parameter of said at least one model and/or the type further includes: if the number of said at least one model equals to 1, calculating the weight of said image as the weight of said image according to the attribute parameter of that model and/or the category to which said image belongs; if the number of said at least one model is greater than 1, for each model of said at least one model: calculating the weight of said image when being associated with the model, according to the attribute parameter of said model and/or the category to which said image belongs; using the maximum weight among all weights as the weight of said image.

In some embodiments, according to the first aspect, said attribute parameters include model's coordinate, model's size and at least one of the importance parameters measuring model's importance.

In some embodiments, according to the first aspect, said method also includes: before loading the full version of said N consecutive images, further includes: releasing the loaded full version of images not included in said N consecutive images.

In some embodiments, according to the first aspect, said method also includes: classifying said plurality of images into M categories of images, wherein the M is an integer greater than or equal to 1; ranking each category of images of said M categories according to their weights and getting an image sequence; selecting X images out of said sequence of images of the category by choosing X consecutive images having maximum weights from said sequence of images of the category, and loading the full version of said X consecutive images; wherein the total size of said X images' full version is less than or equal to a second threshold associated with the category.

In some embodiments, according to the first aspect, before loading the full version of said X consecutive images, said method further includes: releasing the loaded full version of images not included in said X consecutive images.

In some embodiments, according to the first aspect, said method also includes: before creating a new memory-consuming resource, making sure that the memory remaining for said resource has not reached a preset threshold and deleting loaded full version of images to release memory for said resource; selecting Y images from ranked said plurality of images by choosing Y consecutive images having maximum weights from ranked said plurality of images; loading the full version of said Y consecutive images; wherein the total size of said Y consecutive images' full version is less than or equal to a third threshold; said third threshold is less than said first threshold.

In some embodiments, according to the first aspect, said method also includes: before creating a new memory-consuming resource, making sure that the memory remaining for said resource has not reached the preset threshold and deleting loaded full version of images to release memory for said resource; ranking each category of images of said M categories according to their weights and getting an image sequence; selecting Z images out of said sequence of images of the category by choosing Z consecutive images having maximum weights from said sequence of images of the category, and loading the full version of said Z consecutive images; wherein the total size of said Z images' full version is less than or equal to a fourth threshold; said fourth threshold is less than said second threshold.

In the second aspect of the embodiment, there provides a device to load images which includes: a loading unit being configured for loading the thumbnail of each image of a plurality of images; a calculating unit being configured for calculating the weight of each image of said plurality of images; a ranking unit being configured for ranking said plurality of images according to their weights; a selecting unit being configured for selecting N images from the sequenced said plurality of images by choosing N consecutive images having maximum weights, wherein the total size of said N images' full version is less than or equal to the first threshold; said loading unit is also used for loading the full version of said N consecutive images.

In an embodiment, according to the second aspect, said device also includes a thumbnail generating unit for generating said thumbnail of an image, being configured to perform: obtaining a series of MIP maps for respective one of said plurality of images; finding a MIP map of the lowest resolution from said series of MIP maps; generating a thumbnail for said respective image on the basis of the MIP map of the lowest resolution.

In some embodiments, according to the second aspect, the size of said thumbnail is 0.5%-2% of the size of its full version.

In some embodiments, according to the second aspect, said calculating unit also includes a model identifying unit and a weight calculating unit, said model identifying unit is configured for deciding at least one model associated with said image; said weight calculating unit is configured for calculating the weight of said image based on an attribute parameter of said at least one model and/or a category to which said image belongs.

In some embodiments, according to the second aspect, when said weight calculating unit is configured for calculating the weight of said image based on the attribute parameter of said at least one model and/or the category to which said image belongs, by performing the specific steps as follows: if the number of said at least one model equals to 1, calculating the weight of said image as the weight of said image according to the attribute parameter of that model and/or the category to which said image belongs; if the number of said at least one model is greater than 1, for each model of said at least one model: calculating the weight of said image when being associated with the model, according to the attribute parameter of said model and/or the category to which said image belongs; using the maximum weight among all weights as the weight of said image.

In some embodiments, according to the second aspect, said attribute parameters include model's coordinate, model's size and at least one of the importance parameters measuring model's importance.

In some embodiments, according to the second aspect, said device also includes a full version releasing unit being configured for releasing loaded full version of images which are not included in N consecutive images.

In some embodiments, according to the second aspect, said full version releasing unit also includes an image classifying unit being configured for classifying said plurality of images into M categories of images, wherein the M is an integer greater than or equal to 1; said ranking unit being also configured for ranking each category of images of said M categories according to their weights and getting an image sequence; said selecting unit being also configured for selecting X images out of said sequence of images of the category by choosing X consecutive images having maximum weights from said sequence of images of the category, wherein the total size of said X images' full version is less than or equal to a second threshold associated with the category; said loading unit being also configured for loading the full version of said X consecutive images.

In some embodiments, according to the second aspect, said device also includes a full version releasing unit being configured for releasing loaded full version of images which belong to said categories but are not included in X consecutive images.

In some embodiments, according to the second aspect, said device also includes a preset threshold decision unit, a full version deleting unit and a new resources generating unit, wherein: said preset threshold decision unit being configured for making sure that the memory remaining for said resource has not reached a preset threshold; said full version deleting unit being configured for deleting previously loaded full version of images before the memory remained for said resource reaching the preset threshold; said new resources generating unit being configured for releasing memory to generate said resource; said selecting unit further being configured for selecting Y images from said plurality of images by choosing Y consecutive images having maximum weights from said plurality of ranked images; loading the full version of said Y consecutive images; wherein the total size of said Y consecutive images' full version is less than or equal to a third threshold; said third threshold is less than said first threshold; said loading unit further being configured for loading full version of said Y consecutive images.

In some embodiments, according to the second aspect, said device also includes a preset threshold decision unit, a full version deleting unit and a new resources generating unit, wherein said preset threshold decision unit being configured for making sure that the memory remained for said resource has not reached a preset threshold; said full version deleting unit being configured for deleting previously loaded full version of images before the memory remained for said resource reaching the preset threshold; said new resources generating unit being configured for releasing memory to generate said resource; said ranking unit being configured for ranking each category of images of said M categories according to their weights and getting a sequence of images; said selecting unit further being configured for selecting Z images from said sequence of images of said category, by choosing Z consecutive images having maximum weights from said sequence of images of said category, wherein the total size of said Z images' full version is less than or equal to a fourth threshold; said fourth threshold is less than said second threshold; said loading unit further being configured for loading the full version of said Z consecutive images.

In the embodiment of the present invention, there provides a method for loading images, comprises: loading a thumbnail of each image of a plurality of images; calculating a weight of each image of said plurality of images; ranking said plurality of images on the basis of their respective weights; selecting N images out of said plurality of images by choosing N consecutive images having maximum weights from said plurality of ranked images; loading said N images' full version; wherein the total size of said N images' full version is less than or equal to a first threshold.

This method first loads the thumbnail of an image, then optionally loads the full version of an image of N consecutive images having maximum weights from said plurality of images of ranked images, and loads the full version of N consecutive images. There is no need to divide the scenario into several little scenes or reload images. The proposed method can be more widely used in game applications, addressing the problem of inaccurate image loading or slowing down the loading of other resources.

BRIEF DESCRIPTION OF THE FIGURES

With reference to the figures and following detailed descriptions, said and other purposes, features and advantages of the embodiment of the present invention will become easier to understand. The figures exemplify in a non-restrictive way several embodiments of the present invention, wherein.

In the figures, the same or corresponding marks refer to the same or corresponding parts.

DETAILED DESCRIPTION OF THE EMBODIMENTS

The following will describe the theory and spirit of the present invention with reference to several embodiments. It should be understood that these embodiments are only given for technicians in the field to better understand and realize the invention and not in any way limit the scope of the invention. Instead, these embodiments are provided in order to make the disclosure more thorough and complete, and to be able to fully convey the scope of the disclosure to technicians in the field.

Technicians in this field know that the embodiments of the present invention can be implemented as a system, device, apparatus, method and computer program product. Therefore, the disclosure can be specified as follows, namely: complete hardware, complete software (including firmware, resident software, microcode, etc.), or a combination of hardware and software.

According to embodiments of the present invention, it proposes a method for loading images and the device thereof.

Any elements and numbers in figures in this document are only used as examples rather than limitations, and any names are only used to distinguish, not to restrict.

Next, it briefly explains or exemplifies some technical terms that may involve in the present invention.

Game engine: it refers to a programmable computer game system that has been programed or the core components of an interactive real-time image application. These systems provide game designers with a variety of tools to program games whose purpose is to allow game designers to make a game easily and quickly without having to start from scratch.

Figure 1A:
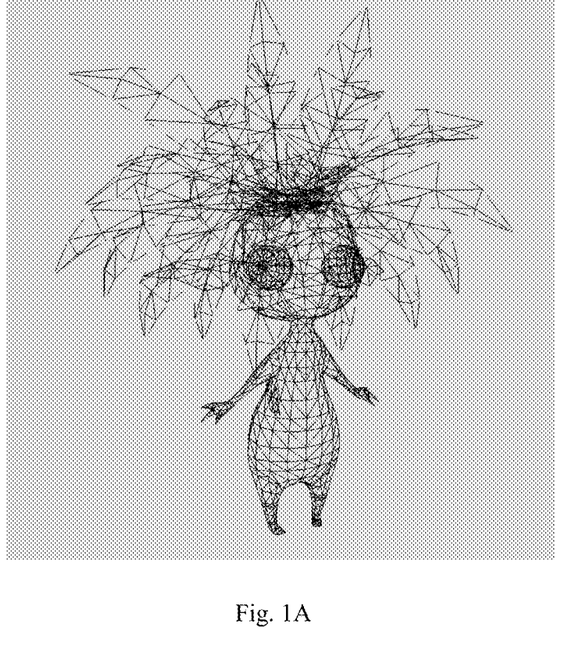
FIG. 1A schematically shows a schematic figure of a model according to an embodiment of the prior art.

A model to be displayed in a game scenario is shown in FIG. 1A.

Figure 1B:
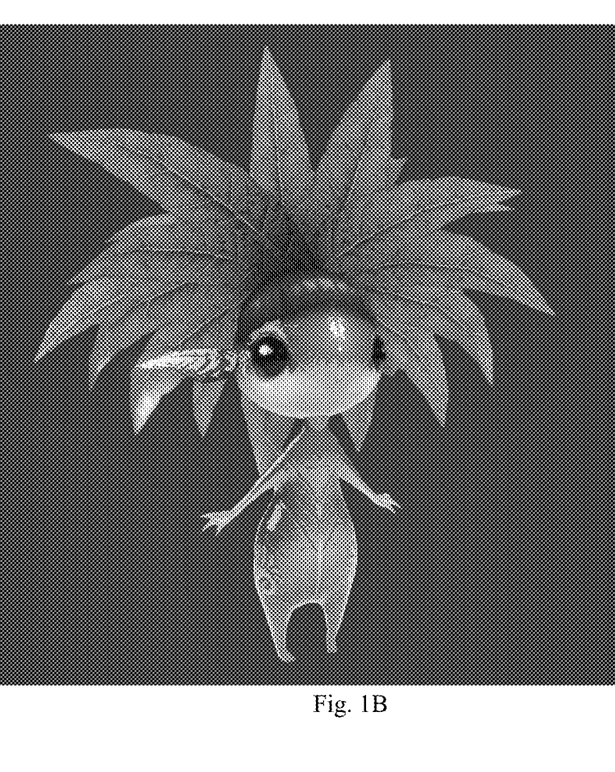
FIG. 1B schematically shows a schematic figure of a texture of images according to an embodiment of the prior art.

Material image: it is also known as a "texture image", which can bring the bitmap stored in a memory to the surface of a 3D rendering item in computer graphics. Texture images provide abundant details with a simple method to simulate a complex appearance, as shown in FIG. 1B.

Mipmap: in order to accelerate the rendering speed and reduce jagged edges, an image is processed to become a file composed of a series of pre-calculated and optimized images, which is called MIP map or mipmap. "MIP" is the initials of Latin words multum in parvo, meaning "small space for a lot of items". If the basic size of an image is 256×256 pixels, a series of mipmaps might have 8 layers, each is a quarter the size of the upper layer, which are: 128×128, 64×64, 32×32, 16×16, 8×8, 4×4, 2×2, and 1×1 pixel orderly.

Memory: it can be called an internal memory, which can be used for temporary storage of intermediary data of CPU (Central Processing Unit), as well as the data exchanged with external storage such as hard drives. During the operation of a computer, CPU puts data into memory for calculation and outputs the result after calculation.

Video memory: it is also called a frame buffer, which can be used to store rendering data processed or to be processed by a special graphics card chip. Like said memory of a computer, video memory is a component for storing graphic information to be processed.

Next explain the theory and spirit of the present invention according to several representative embodiments.

Overview of the Invention

The inventor finds that during the process of loading images, the computer can load the thumbnail of all images rather than the full version of all images, and next, the computer can load the full version of images optionally according to a preset strategy. For example, the inventor intends to calculate a weight of each image of a plurality of images; rank said plurality of images on the basis of their respective weights; select N images out of said plurality of images by choosing N consecutive images having maximum weights from said plurality of ranked images; and load the full version of N consecutive images. In this way, this method can improve the fluency of a game without affecting other programs, and can avoid the prior art's disadvantages like limited application, inaccurate identification of loading images and affecting the load of other resources.

After introducing certain basic terms of the present invention, it next introduces nonrestrictive embodiments of the present invention.

Application Scenario

According the description above, assuming there are 100 images, the embodiment of the present invention needs to calculate the weights of the 100 images; ranking the 100 images according their weights; selecting the first 80 images from the ranked 100 images with the largest weights; and loading the thumbnails of the 100 images and the full version of selected 80 consecutive images. In this way, this method can improve the fluency of a game without affecting other programs, and can avoid the conventional approaches' disadvantages, e.g., being applicable in limited games, inaccurate loading of images and interfering the loading of other resources.

It shall be noted that, the game in this embodiment of the present invention can be a terminal-based game, a browser-based game, a mobile phone-based game and other kinds of game, which is not restricted here.

The terminal for running a game can be any existing, developing or to be developed smart phone, functional phone, tablet computer, personal computer, etc., which is not restricted in the present invention.

Exemplary Method

Figure 2:
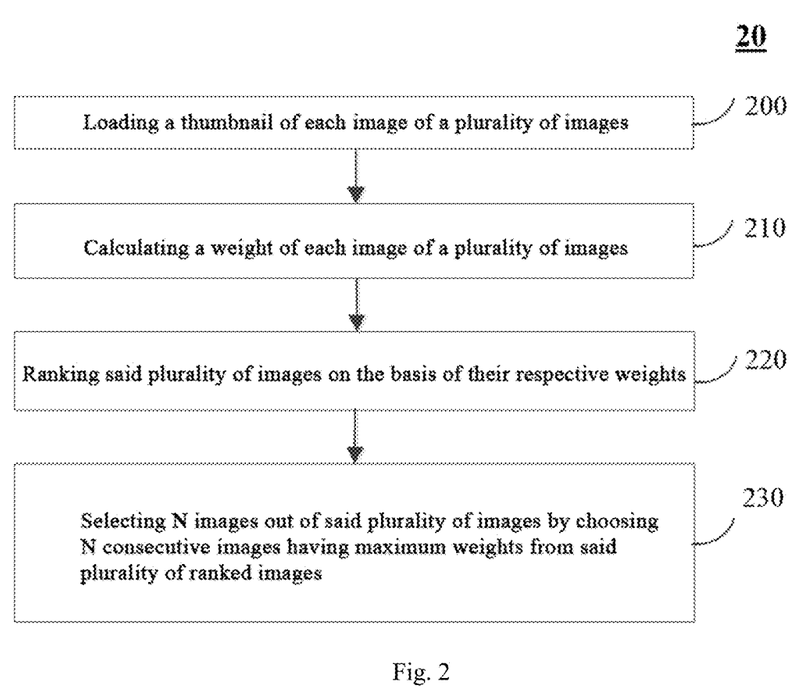
FIG. 2 schematically shows a flow chart of a method for loading images according to one embodiment of the present invention.

Next, it describes a method for loading images as an embodiment of the present invention according to FIG. 2, combined with the description of a scenario. It is worth noting that said scenario is only to facilitate the understanding of the theory and spirit of the present invention, and the embodiment of the present invention is not subject to any restrictions in this regard. Instead, the embodiment of the present invention can be applied to any applicable scenario.

FIG. 2 shows a flow chart of method 20 for loading images according to embodiments of the present invention. As shown in FIG. 2, the method may include step 200, step 210, step 220 and step 230.

Step 200: load a thumbnail of each image of a plurality of images.

In the embodiment of the present invention, said thumbnail is generated by following steps: obtaining a series of MIP maps for respective one of said plurality of images; finding a MIP map of the lowest resolution from said series of MIP maps; generating a thumbnail for said respective image on the basis of the MIP map of the lowest resolution.

In the embodiment of the present invention, optionally, the size of said thumbnail is 0.5%-2% the size of full version of the image.

The embodiment of the present invention can further indicate the size of the full version and that of the thumbnail. For example, there are 3 images: image 1, image 2 and image 3. Image 1 is linked to a thumbnail 1 and a full version 1; image 2 is linked to a thumbnail 2 and a full version 2; and image 3 is linked to a thumbnail 3 and a full version 3. In this situation, thumbnail 1 indicates the size of full version 1; thumbnail 2 indicates the size of full version 2; and thumbnail 3 indicates the size of full version 3.

It is important to note that the present invention does not restrict the specific way or position of marks of the full version, for example, the size of the full version can be marked at the tail of the thumbnail.

In this way, because the thumbnail marks the size of the full version, when loading the full version later on, it decides whether there is enough memory to load the full version according to said marked size. It is not necessary to determine whether there is enough memory to load the full version by actually loading and seeing whether it successes or fails. This improves efficiency and avoids a waste of resources.

According to embodiment of the present invention, only thumbnails are loaded in the initial load process, which can reduce the memory used in the initial process and load as much game resources as possible, and speed up image loading process.

Step 210: calculate a weight of each image of said plurality of images.

In the embodiment of the present invention, there are several methods to calculate the weight of each image of said plurality of images. Optionally, the following method can be adopted: deciding at least one model associated with said image; calculating the weight of said image based on an attribute parameter of said at least one model and/or a category to which said image belongs.

When further calculating the weight of said image based on an attribute parameter of said at least one model and/or the category to which said image belongs, optionally, the following method can be adopted.

If the number of said at least one model equals to 1, calculating the weight of said image as the weight of said image according to the attribute parameter of that model and/or the category to which said image belongs; if the number of said at least one model is greater than 1, for each model of said at least one model:

Calculating the weight of said image when being associated with the model, according to the attribute parameter of said model and/or the category to which said image belongs; using the maximum weight among all weights as the weight of said image.

For example, if an image is linked to a model, calculate the weight of said image as the weight of said image according to the attribute parameter of that model and/or the category of said image; if an image is linked to two models (model 1 and model 2), it calculates the weight of said image as weight 1 according to the attribute parameter of model 1 and/or the category to which said image belongs; it also calculates the weight of said image as weight 2 according to the attribute parameter of model 2 and/or the category to which said image belongs; then, it takes the larger weight of weight 1 and weight 2 as the weight of said image.

In the embodiment of the present invention, said attribute parameters include a model's coordinate, a model's size and at least one of the importance parameters measuring a model's importance, but not limited to the parameters mentioned above.

In the embodiment of the present invention, to improve the accuracy of loading images, optionally, it calculates the weight of each image of the plurality of images periodically.

Step 220: ranking said plurality of images on the basis of their respective weights.

Step 230: selecting N images out of said plurality of images by choosing N consecutive images having maximum weights from said plurality of ranked images, and loading said N images' full version; wherein the total size of said N images' full version is less than or equal to a first threshold.

According to the embodiment of the present invention, to avoid affecting other resources, before loading the full version of said N consecutive images, said method 20 may further include: releasing the loaded full version of images not included in said N consecutive images.

In this way, other resources can use the released memory and thus avoid affecting other resources.

As described above, all weights are ranked together. In real practice, images can also be classified, then it ranks all images in the same category. Therefore, the embodiment of the invention may also include the following operations: classifying said plurality of images into M categories of images, wherein the M is an integer greater than or equal to 1; ranking each category of images of said M categories according to their weights and getting a sequence of images; selecting X images out of said sequence of images of the category by choosing X consecutive images having maximum weights from said sequence of images of the category, and loading the full version of said X consecutive images; wherein the total size of said X images' full version is less than or equal to a second threshold.

For example, there are ten images: image 1, image 2, image 3, image 4, image 5, image 6, image 7, image 8, image 9 and image 10, whose weights are weight 1, weight 2, weight 3, weight 4, weight 5, weight 6, weight 7, weight 8, weight 9 and weight 10 respectively. There are three categories of images: category 1 includes image 1, image 3 and image 10; category 2 includes image 2 and image 9; category 3 includes image 4, image 5, image 6, image 7 and image 8. For category 1, it ranks image 1, image 3 and image 10 according to their weights, selects X1 consecutive images and loads the full version of said X1 consecutive images; for category 2, it ranks image 2 and image 9 according to their weights, selects X2 consecutive images and loads the full version of said X2 consecutive images; for category 3, it ranks image 4, image 5, image 6, image 7 and image 8 according to their weights, and selects X3 consecutive images and loads the full version of said X3 consecutive images; wherein, X1, X2 and X3 are integers.

In the embodiment of the present invention, the images can be "scenario images", "role/character images" or other kind of images which are not restricted here.

In the embodiment of the present invention, the second thresholds of different categories can be either same or different. In the above example, the second thresholds of category 1, category 2 and category 3 are threshold 1, threshold 2 and threshold 3 respectively. Threshold 1, threshold 2 and threshold 3 can be totally different or the same, or any two of which are the same.

With this method in the embodiment of the present invention, to avoid affecting other resources, before loading the full version of said X consecutive images, said method 20 may further include: releasing the loaded full version of images not included in said X consecutive images.

In this way, other resources can use the released memory and avoid affecting other resources.

In the embodiment of the present invention, to avoid affecting other resources, the method may further include the following operations: before creating a new memory-consuming resource, making sure that the memory remained for said resource has not reached a preset threshold, and deleting loaded full version of images in order to release memory for said resource; selecting Y images from said plurality of images by choosing Y consecutive images having maximum weights from said plurality of ranked images; loading the full version of said Y consecutive images; wherein the total size of said Y consecutive images' full version is less than or equal to a third threshold; said third threshold is less than said first threshold.

That is to say, before creating a new memory-consuming resource, it checks whether the memory remained for said resource has not reached a preset threshold, if yes, it deletes previously loaded full version of images in order to release memory for said resource, and then it load the full version of selected Y consecutive images.

Or, the present invention can further adopt the following method to avoid affecting other resources: before creating a new memory-consuming resource, making sure that the memory remained for said resource has not reached a preset threshold and deleting loaded full version of images to release memory for said resource; ranking each category of images of said M categories according to their weights and getting a sequence of images; selecting Z images out of said sequence of images of the category by choosing Z consecutive images having maximum weights from said sequence of images of the category, and loading the full version of said Z consecutive images; wherein the total size of said Z consecutive images' full version is less than or equal to a fourth threshold; said fourth threshold is less than said second threshold.

That is to say, before creating a new memory-consuming resource, it makes sure that the memory remained for said resource has not reached a preset threshold and deletes loaded full version of images in order to release memory for said resource; and then for each category, it loads the full version of selected Z consecutive images, wherein M, X, Y and Z are integers.

In the embodiment of the present invention, when loading the thumbnails, optionally, thumbnails can be loaded to the video memory. While when loading the full version, optionally, full version can be loaded to the memory. This is only an example of loading thumbnails and full version. Practice is not restricted.

The embodiment of the present invention provides a method for loading images: loading a thumbnail of each image of a plurality of images; calculating a weight of each image of said plurality of images; ranking said plurality of images on the basis of their respective weights; selecting N images out of said plurality of images by choosing N consecutive images having maximum weights from said plurality of ranked images; loading said N images' full version; wherein the total size of said N images' full version is less than or equal to a first threshold, wherein N is an integer.

This method first loads the thumbnail of an image, then optionally, it loads the full version of an image from N consecutive images having maximum weights from said plurality of ranked images, and loads the full version of N consecutive images without dividing the scenario into several small scenes or reloading images. Therefore, the method can improve the fluency of a game without interfering other programs, and overcome prior arts' drawbacks, such as limited application, low accuracy of loading and interference of other resources.

Wherein N is an integer.

Exemplary Device

Figure 3:
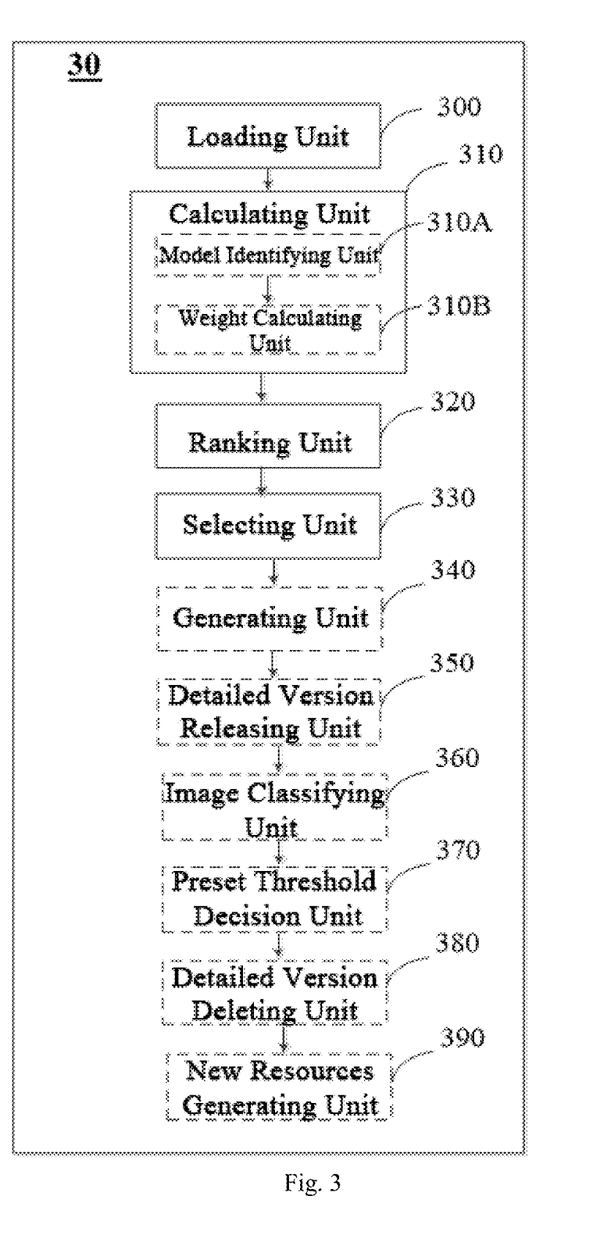
FIG. 3 schematically shows a schematic figure of a device being configured for loading images according to one embodiment of the present invention.

Next describe a device for loading images of an embodiment of the present invention according to FIG. 3.

FIG. 3 schematically shows a schematic figure of device 30 being configured for loading images according to the present invention. As shown in FIG. 3, said device 30 includes:

Loading unit 300 being configured for loading the thumbnail of each image of a plurality of images;

Calculating unit 310 being configured for calculating the weight of each image of said plurality of images;

Ranking unit 320 being configured for ranking said plurality of images on the basis of their respective weights;

Selecting unit 330 being configured for selecting N images from said plurality of images by choosing N consecutive images having maximum weights from said plurality of ranked images, wherein the total size of said N images' full version is less than or equal to the first threshold;

Said loading unit 300 is also used for loading said N images' full version.

In the embodiment of the present invention, optionally, said device may also include a generating unit 340 being configured for generating said thumbnail of an image by: obtaining MIP maps for said images; finding a MIP map of the lowest resolution from said series of MIP maps; generating a thumbnail on the basis of the MIP map of the lowest resolution.

In the embodiment of the present invention, optionally, the size of said thumbnail is 0.5%-2% of the size of its full version.

In the embodiment of the present invention, loading unit 300 can further mark the size of the full version and that of the thumbnail. For example, there are 3 images: image 1, image 2 and image 3. Image 1 is linked to thumbnail 1 and full version 1; image 2 is linked to thumbnail 2 and full version 2; and image 3 is linked to thumbnail 3 and full version 3. In this situation, loading unit 300 marks the size of full version 1 in thumbnail 1; loading unit 300 marks the size of full version 2 in thumbnail 2; and loading unit 300 marks the size of full version 3 in thumbnail 3.

It is important to note that the present invention does not restrict the specific way or position of marks of the full version, for example, the size of the full version can be marked at the tail of the thumbnail.

In this way, because the thumbnail marks the size of the full version, when loading the full version later on, judgment of whether there is enough memory to load the full version can be make according to its size. It is not necessary to determine whether there is enough memory to load the full version by actually loading and seeing whether it successes or fails. This improves efficiency and avoids a waste of resources.

According to embodiment of the present invention, only thumbnails are loaded in the initial load process loads which can reduce the memory used in the initial process and load as much game resources as possible, and speed up image loading process.

In the embodiment of the present invention, optionally, said calculating unit 310 includes a model identifying unit 310A and a weight calculating unit 310B.

Said model identifying unit 310A is configured for identifying at least one model associated with said image;

Said weight calculating unit 310B is configured for calculating the weight of said image based on an attribute parameter of said model and/or a category to which said image belongs.

When said weight calculating unit 310B is calculating the weight of said image according to the attribute parameter of said model and/or the category to which said image belongs, the specific steps are:

if the number of said at least one model equals to 1, calculating the weight of said image as the weight of said image according to the attribute parameter of that model and/or the category to which said image belongs; if the number of said at least one model is greater than 1, for each model of said at least one model: calculating the weight of said image when being associated with the model, according to the attribute parameter of said model and/or the category to which said image belongs; using the maximum weight among all weights as the weight of said image.

For example, if an image is linked to a model, calculating unit 310B calculates the weight of said image as the weight of said image according to the attribute parameter of that model and/or the category to which said image belongs; if an image is linked to two models (model 1 and model 2), calculating unit 310B calculates the weight of said image as weight 1 according to the attribute parameter of model 1 and/or the category to which said image belongs; calculating unit 310B calculates the weight of said image as weight 2 according to the attribute parameter of model 2 and/or the category to which said image belongs; take the larger weight of weight 1 and weight 2 as the weight of said image.

In the embodiment of the present invention, said attribute parameters include model's coordinate, model's size and at least one of the importance parameters measuring model's importance, but not limited to parameters above.

In the embodiment of the present invention, to improve the accuracy of loading images, optionally, calculate the weight of each image of a plurality of images periodically.

In the embodiment of the present invention, to avoid affecting other resources, said device also includes a full version releasing unit 350 being configured for releasing loaded full version of images which are not included in N consecutive images.

In this way, other resources can use the released memory and avoid affecting other resources.

As described above, all weights are ranked together. In real practice, images can also be classified and rank all images in the same category. Therefore, according to the embodiment of the invention, said device 30 may also include an image classifying unit 360 being configured for classifying said plurality of images into M categories of images, wherein the M is an integer greater than or equal to 1.

Said ranking unit 320 is also configured for ranking each category of images of said M categories according to their weights and getting a sequence of images.

Said selecting unit 330 is also configured for selecting X images out of said sequence of images of the category by choosing X consecutive images having maximum weights from said sequence of images of the category, and loading the full version of said X consecutive images; wherein the total size of said X images' full version is less than or equal to a second threshold associated with the category.

Said loading unit 300 is also configured for loading the full version of said X consecutive images.

For example, there are ten images: image 1, image 2, image 3, image 4, image 5, image 6, image 7, image 8, image 9 and image 10, whose weights are weight 1, weight 2, weight 3, weight 4, weight 5, weight 6, weight 7, weight 8, weight 9 and weight 10 respectively. There are three categories of images: category 1 includes image 1, image 3 and image 10; category 2 includes image 2 and image 9; category 3 includes image 4, image 5, image 6, image 7 and image 8. For category 1, rank image 1, image 3 and image 10 according to their weights, select X1 consecutive images and load the full version of said X1 consecutive images; for category 2, rank image 2 and image 9 according to their weights, select X2 consecutive images and load the full version of said X2 consecutive images; for category 3, rank image 4, image 5, image 6, image 7 and image 8 according to their weights, select X3 consecutive images and load the full version of said X3 consecutive images.

Wherein, X1, X2 and X3 are integers.

In the embodiment of the present invention, the images can be scenario images, role images or other kind of images which are not restricted here.

In the embodiment of the present invention, the second thresholds for different linked categories can be the same of different. For example, the second thresholds of category 1, category 2 and category 3 are threshold 1, threshold 2 and threshold 3 respectively. Threshold 1, threshold 2 and threshold 3 can be totally different or the same, or any two of which are the same.

With this method in the embodiment of the present invention, to avoid affecting other resources, said device 30 may also include full version releasing unit 350 being configured for releasing the loaded full version of images not included in said X consecutive images.

In this way, other resources can use the released memory and avoid affecting other resources.

In the embodiment of the present invention, to avoid affecting other resources, said device 30 may also include preset threshold decision unit 370, full version deleting unit 380 and new resources generating unit 390.

Said preset threshold decision unit 370 being configured for making sure that the memory remained for said resource has not reached a preset threshold;

Said full version deleting unit 380 being configured for deleting loaded full version of images before the memory remained for said resource reaching the preset threshold;

Said new resources generating unit 390 being configured for releasing memory to generate said resource;

Said selecting unit 330 further being configured for selecting Y images from ranked said plurality of images by choosing Y consecutive images having maximum weights from ranked said plurality of images; loading the full version of said Y consecutive images; wherein the total size of said Y consecutive images' full version is less than or equal to a third threshold; said third threshold is less than said first threshold;

Said loading unit 300 further being configured for loading full version of said Y consecutive images.

That is to say, before said new resources generating unit 390 creates a new memory-consuming resource, said preset threshold decision unit 370 will make sure that the memory remained for said resource has not reached the preset threshold and said full version deleting unit 380 will delete loaded full version of images to release memory for said resource; and then said loading unit 300 will load the full version of said Y consecutive images.

In the embodiment of the present invention, optionally, said device 30 may also include preset threshold decision unit 370, full version deleting unit 380 and new resources generating unit 390.

Said preset threshold decision unit 370 being configured for making sure that the memory remained for said resource has not reached a preset threshold;

Said full version deleting unit 380 being configured for deleting loaded full version of images before the memory remained for said resource reaching the preset threshold;

Said new resources generating unit 390 being configured for releasing memory to generate said resource;

Said ranking unit 320 being configured for ranking each category of images of said M categories according to their weights and getting a sequence of images;

Said selecting unit 330 further being configured for selecting Z images out of said sequence of images of the category by choosing Z consecutive images having maximum weights from said sequence of images of the category, wherein the total size of said Z images' full version is less than or equal to a fourth threshold; said fourth threshold is less than said second threshold;

Said loading unit 300 further being configured for loading the full version of said Z consecutive images.

That is to say, before said new resources generating unit 390 creates a new memory-consuming resource, said preset threshold decision unit 370 will make sure that the memory remained for said resource has not reached the preset threshold and said full version deleting unit 380 will delete loaded full version of images to release memory for said resource; and then said loading unit 300 will load the full version of said Z consecutive images.

Wherein M, X, Y and Z are integers.

In the embodiment of the present invention, when the loading unit 300 loads the thumbnails, optionally, thumbnails can be loaded to the video memory, while when loading the full version, optionally, full version can be loaded to the memory.

This is only an example of loading thumbnails and full version. Practice is not restricted.

The embodiment of the present invention provides a method for loading images: loading a thumbnail of each image of a plurality of images; calculating a weight of each image of the plurality of images; ranking said plurality of images on the basis of their respective weights; selecting N images out of said plurality of images by choosing N consecutive images having maximum weights from said plurality of ranked images; loading said N images' full version; wherein the total size of said N images' full version is less than or equal to a first threshold. This method first loads the thumbnail of an image, then optionally loads the full version of an image from N consecutive images having maximum weights from said plurality of images of ranked images, and loads the full version of N consecutive images without dividing the scenario into several small scenes or reloading images, and can avoid limited application, inaccurate identification of the images or affecting the load of other resources.

Wherein N is an integer.

Exemplary Device

Next introduce a device for loading images in another embodiment of the present invention.

Technicians in this field can understand that any aspect of the present invention can become systems, methods and program products. Therefore, any aspect of the present invention can be implemented as follows, namely: full hardware implementations, full software implementations (including firmware, microcode, etc.), or a combination of hardware and software implementations, here referred to as "circuit", "module" or "system".

In some attainable embodiments, the device for loading images according to the present invention at least includes at least one processing unit and at least one storage unit. Wherein, said storage unit stores the code, and when the code is processed by said processing unit, said processing unit processes steps of said "exemplary method" in the instruction in this technical note according to the method for loading images in the embodiments of the present invention. For example, said processing unit can process step 200 shown in FIG. 2: loading a thumbnail of each of the plurality of images; steps 210: calculating a weight of each of the plurality of images; steps 220: ranking said plurality of images on the basis of their respective weights; steps 230: selecting N images out of said plurality of images by choosing N consecutive images having maximum weights from said plurality of ranked images; loading said N images' full version; wherein the total size of said N images' full version is less than or equal to a first threshold.

Figure 4:
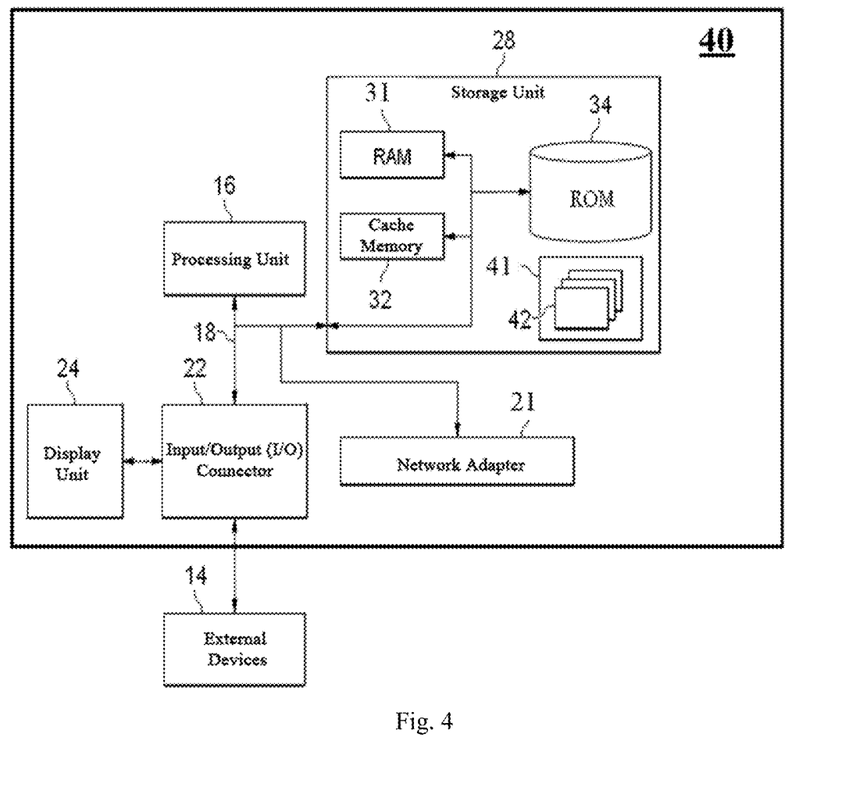
FIG. 4 schematically shows another schematic figure of a device being configured for loading images according to one embodiment of the present invention.

FIG. 4 describes the device 40 for loading images according to the embodiment of the present invention. The device 40 for loading images shown in FIG. 4 is only an example and should not bring any restriction to the function and scope of application of the embodiment of the present invention.

As shown in FIG. 4, device 40 for loading images is presented in the form of a general computing device. Components of device 40 for loading images include, but are not limited to: at least one said processing unit 16, at least one said storage unit 28, and bus 18 connecting different systems (including storage unit 28 and processing unit 16).

Bus 18 represents one or more kinds of bus structures, including the memory bus or memory controller, peripheral bus, accelerated graphics port, processor, or use any of the many local bus.

Storage unit 28 may include readable media in the form of nonvolatile memory, such as random access memory (RAM) 31 and/or cache memory 32, and read-only memory (ROM) 34.

Storage unit 28 can also include a set of (at least one) programs of the program module 42/utility 41. Said program module 42 includes, but is not limited to: operating systems, one or multiple applications, other program modules and program data. Each one or the combination of some of these examples may include the implementation of network environment.

Device 40 for loading images can also communicate with one or multiple external devices 14 (for example, a keyboard, a pointing device, a Bluetooth device, etc.). It can also communicate with one or multiple devices that can make users interactive with said device 40 for loading images, and/or communicate with any devices that can make said device 40 for loading images communicate with one or multiple calculation devices (for example, a router, a modem, etc.). This communication can pass through the input/output (I/O) connector 22. And the device 40 for loading images can also communicate with one or multiple networks (for example, a local area network (LAN), wide area network (WAN) and/or public networks such as the Internet) through network adapter 21. As shown in the figure, network adapter 21 communicate with other modules of device 40 for loading images through bus 18. It should be understood that although not shown in the figure, the hardware and/or software that can be combined with device 40 for loading images include but is not limited to: microcode, device drivers, redundant processing units, external disk drive arrays, RAID systems, tape drives and data backup storage systems.

Exemplary Program Product

In some attainable embodiments, all aspects of the present invention may be presented in the form of program products, including program codes. When said program product is running on a terminal device, said program code is used to implement steps of the method for loading images according to the embodiments of the present invention in said "exemplary method" session of this technical specification. For example, said terminal devices can implement steps shown in FIG. 2: step 200: loading a thumbnail of each image of a plurality of images; step 210: calculating a weight of each image of the plurality of images; step 220: ranking said plurality of images on the basis of their respective weights; step 230: selecting N images out of said plurality of images by choosing N consecutive images having maximum weights from said plurality of ranked images; loading said N images' full version; wherein the total size of said N images' full version is less than or equal to a first threshold.

Said program product can be a combination of one or multiple readable media. Readable media can be readable signal media or readable storage media. Readable storage media, for example, can be, but is not limited to electricity, magnetism, light, electromagnetism, infrared ray, or semiconductor systems, devices, or equipment, or any combination of the above. More specific examples (not a list of all) of storage media include: an electric connection with one or multiple wire, a portable disc, a hard disk, a random access memory (RAM), a read-only memory (ROM), an erasable programmable read-only memory (EPROM or Flash), a fiber, a portable compact disc read-only memory (CD-ROM), a light storage device, a magnetic storage device, or a reasonable combination of any of the above.

Figure 5:
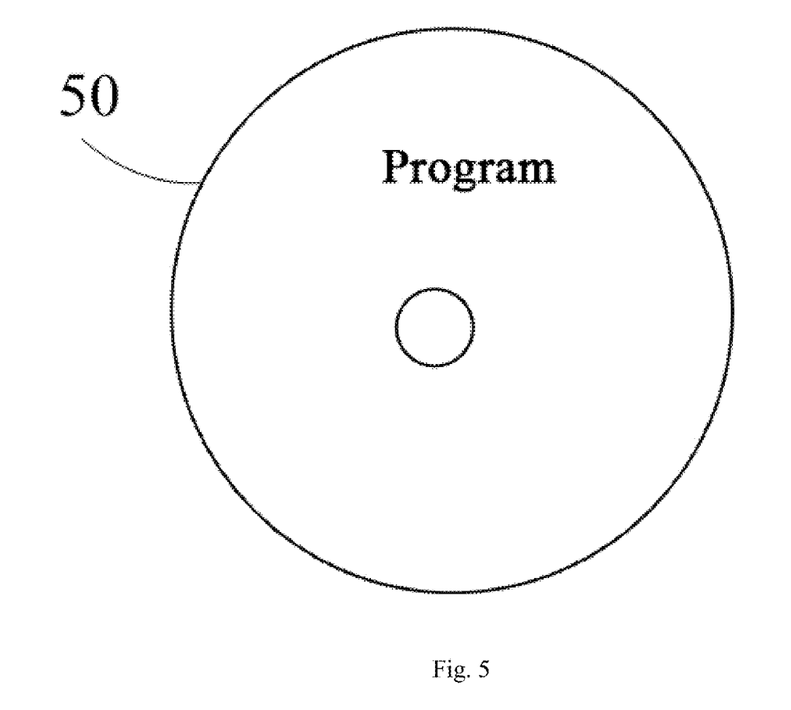
FIG. 5 schematically shows another schematic figure of a device being configured for loading images according to one embodiment of the present invention.

FIG. 5 describes a program product 50 for loading images according to the embodiment of the present invention, which can be used for portable compact disc read-only memory (CD-ROM), contain the program code, and run on a terminal, such as a PC. However, program product of the present invention is not limited to this. In this file, readable storage media can be any tangible media containing or storing a program which can implement a system, a device or an equipment, or can be used with them.

Readable signal media may be included in a base-band or as a part of the data signals for transmitting, which carries the readable code. Said data signals can take many forms, including-but not limited to the electromagnetic signals, light signals or any reasonable combination of the above. Readable signal media can also be any other readable media other than readable storage medium, which can send, transmit or carry a program to implement a system, a device or an equipment or to be used with them.

The code in readable media can be transmitted through any appropriate media, including but not limited to wireless, wireline, cable, RF, etc., or any appropriate combination of the above.

The code of the present invention can be programmed in a combination of one or multiple programming languages. Said programming languages include object-oriented programming language such as Java, C++, etc., and conventional programming language, such as "c" language or a similar programming languages. The code can run fully on user's computing device, run partially on the user's device, run as an independent software package, run partially on part of a remote computing device on user's computing device, or run fully on a remote computing device or a server. In cases involving the remote computing device, the remote computing device can be connected to user's computing device through any kind of networks—including local area network (LAN) or wide area network (WAN), or it can be connected to external computing devices (for example, connecting with the Internet through Internet service provider).

It should be noted that, although a detailed description of several devices or sub-devices of the device for loading images is mentioned above, the differentiation is not mandatory. In fact, according to the embodiment of the present invention, the features and functions of said two or more devices can be achieved in one device. On the contrary, the features and functions of said one device can be specified by several devices.

Moreover, although the operation of this method is described in a specific order in the figures, this is not a requirement of implication that these operations must follow the specific order or all operations must be adopted to achieve the desired results. Additionally, or alternatively, some steps can be omitted, multiple steps can be combined as one, or one step can be divided into several.

Although the spirit and theory of the present invention are described by several embodiments, it should be understood that the present invention is not limited to the embodiments publicized in this file, and the division of various aspects does not mean that these characteristics cannot be combined for the benefit. This division is made only for convenience.

The present invention is intended to cover all modifications and similar arrangements within the scope of the spirit of the claims attached below.

What is claimed is:

1. A method executable by a processor of a terminal device for loading images, the method comprising:
  loading, and displaying to a user of the terminal device, a thumbnail of each image of a plurality of images, wherein the plurality of images are configured to form a surface of a 3D rendering item to be displayed on the terminal device, and wherein each image includes a full version, and the thumbnail of each image includes size information of the full version;
  calculating a weight of each image of said plurality of images, wherein the step of calculating the weight of each image of said plurality of images further comprises:
    deciding at least one 3D model associated with said image; and
    calculating the weight of said image based on an attribute parameter of said at least one 3D model, wherein said attribute parameter comprises at least one of model's coordinate, model's size and importance parameter measuring model's importance;
  ranking said plurality of images on the basis of respective weights of said plurality of images;
  selecting N images out of said plurality of images by choosing N consecutive images having maximum weights from said plurality of ranked images, wherein the step of selecting comprises:
    determining, based on the size information of the full version included in each thumbnail, whether the total size of said N images' full version is less than or equal to a first threshold; and
    selecting said N images in response to that the total size of said N images' full version is less than or equal to the first threshold; and
  loading, and displaying to the user of the terminal device, said N images' full version, such that the N images' full versions are used for display to the user instead of the N images' corresponding thumbnails.

2. The method of claim 1, wherein the thumbnail is generated by following steps:
  obtaining a series of MIP maps for respective one of said plurality of images;
  finding a MIP map of the lowest resolution from said series of MIP maps; and
  generating a thumbnail for said respective image on the basis of the MIP map of the lowest resolution.

3. The method of claim 1, wherein the step of calculating the weight of said image based on the attribute parameter of said at least one model further comprises:
  if the number of said at least one model equals to 1, calculating the weight of said image as the weight of said image according to the attribute parameter of that model to which said image belongs;
  if the number of said at least one model is greater than 1, for each model of said at least one model:
    calculating the weight of said image when being associated with the model, according to the attribute parameter of said model to which said image belongs; and
    using the maximum weight among all weights as the weight of said image.

4. The method of claim 1, before loading the full version of said N consecutive images, further comprises:
  releasing the loaded full version of images not included in said N consecutive images.

5. The method of claim 1 further comprises:
  classifying said plurality of images into M categories of images, wherein the M is an integer greater than or equal to 1;
  ranking each category of images of said M categories according to their weights and getting a sequence of images;
  selecting X images out of said sequence of images of the category by choosing X consecutive images having maximum weights from said sequence of images of the category, and loading the full version of said X consecutive images; and
  wherein the total size of said X images' full version is less than or equal to a second threshold associated with the category.

6. The method of claim 5, before loading the full version of said X consecutive images, said method further comprises:
  releasing the loaded full version of images not included in said X consecutive images.

7. The method of claim 1 further comprising:
  before creating a new memory-consuming resource, making sure that the memory remained for said resource has not reached a preset threshold and deleting loaded full version of images to release memory for said resource;
  selecting Y images from ranked said plurality of images by choosing Y consecutive images having maximum weights from ranked said plurality of images; loading the full version of said Y consecutive images; and
  wherein the total size of said Y consecutive images' full version is less than or equal to a third threshold; said third threshold is less than said first threshold.

8. A device for loading images, comprising:
  a processor, and a memory configured to store instructions executable by the processor, wherein the processor is configured for:
  loading, and causing a display unit to display to a user of the device, a thumbnail of each image of a plurality of images, wherein the plurality of images are configured to form a surface of a 3D rendering item to be displayed on the device, wherein each image includes a full version, and the thumbnail of each image includes size information of the full version;
  calculating the weight of each image of said plurality of images, wherein the processor is further configured for:
    decidinq at least one 3D model associated with said image; and
    calculatinq the weight of said image based on an attribute parameter of said at least one 3D model, wherein said attribute parameter comprises at least one of model's coordinate, model's size and importance parameter measuring model's importance;
  ranking said plurality of images on the basis of respective weights of said plurality of images;
  selecting N images from the sequenced said plurality of images by choosing N consecutive images having maximum weights, wherein the processor is further configured for:
    determining, based on the size information of the full version included in each thumbnail, whether the total size of said N images' full version is less than or equal to a first threshold; and selecting said N images in response to that the total size of said N images' full version is less than or equal to the first threshold; and wherein the processor is further configured for loading, and causing the display unit to displaying to the user of the device, the full version of said N consecutive images, such that the N images' full versions are used for display to a user instead of the N images' corresponding thumbnails.

9. A non-transitory computer-readable storage medium for storing a program of instructions executable by a processor of a terminal device to perform a process, the process comprising:

loading, and displaying to a user of the terminal device, a thumbnail of each image of a plurality of images, wherein the plurality of images are configured to form a surface of a 3D rendering item to be displayed on the terminal device;

calculating a weight of each image of said plurality of images, wherein the step of calculating the weight of each image of said plurality of images further comprises:

deciding at least one 3D model associated with said image; and calculating the weight of said image based on an attribute parameter of said at least one 3D model, wherein said attribute parameter comprises at least one of model's coordinate, model's size and importance parameter measuring model's importance;

ranking said plurality of images on the basis of respective weights of said plurality of images;

selecting N images out of said plurality of images by choosing N consecutive images having maximum weights from said plurality of ranked images, wherein the step of selecting comprises:

determining, based on the size information of the full version included in each thumbnail, whether the total size of said N images' full version is less than or equal to a first threshold; and selecting said N images in response to that the total size of said N images' full version is less than or equal to the first threshold; and loading, and displaying to the user of the terminal device, said N images' full version, such that the N images' full versions are used for display to the user instead of the N images' corresponding thumbnails.

* * * * *